United States Patent [19]
Horikawa

[11] Patent Number: 4,631,394
[45] Date of Patent: Dec. 23, 1986

[54] FOCUSING DEVICE FOR OPTICAL SYSTEMS

[75] Inventor: Yoshiaki Horikawa, Hachiouji, Japan

[73] Assignee: Olympus Optical Co., Ltd., Tokyo, Japan

[21] Appl. No.: 781,329

[22] Filed: Sep. 30, 1985

Related U.S. Application Data

[63] Continuation-in-part of Ser. No. 436,488, Oct. 25, 1982, abandoned.

[51] Int. Cl.$^4$ .......................... G01J 1/20; G03B 3/00; G03B 13/18
[52] U.S. Cl. .................................... 250/201; 250/204; 354/404
[58] Field of Search ................ 250/201 PF, 201 AF, 250/204; 354/403, 404, 406, 409; 356/1, 4

[56] References Cited

U.S. PATENT DOCUMENTS

| | | | |
|---|---|---|---|
| 3,906,219 | 9/1975 | Stauffer | 250/204 |
| 4,063,814 | 12/1977 | Rhodes | 250/204 |
| 4,104,517 | 8/1978 | Mesch et al. | 250/204 |
| 4,373,791 | 2/1983 | Araki | 250/204 |
| 4,394,569 | 7/1983 | Nakamura | 250/204 |
| 4,419,574 | 12/1983 | Kawabata et al. | 250/204 |
| 4,500,778 | 2/1985 | Kusaka et al. | 250/204 |

Primary Examiner—David C. Nelms
Assistant Examiner—S. Allen
Attorney, Agent, or Firm—Cushman, Darby & Cushman

[57] ABSTRACT

A focusing device for optical systems provided with a rotatable light interrupting plate having a first light passing zone and second light passing zone, an image sensor receiving two kinds of images formed by light bundles having passed through the light interrupting plate and converting the respective light intensity distributions to photoelectric signals, a central operation circuit digital-converting the photoelectric signals from the image sensor, then operating them according to a predetermined evaluating function and able to display the state of focusing and the amount and direction of deviation from the focus position and an image information processing circuit able to feed only proper photoelectric signals from the image sensor to the central operation circuit, in order to be able to detect accurately and with a high sensitivity whether focusing is made or not and to detect the amount and direction of deviation from the focus position. The light interrupting plate may be triangular prism light-shielded in the central part.

5 Claims, 18 Drawing Figures

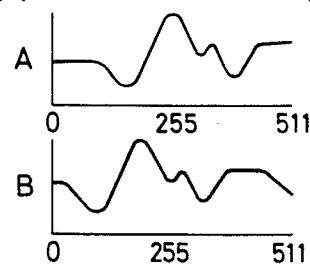
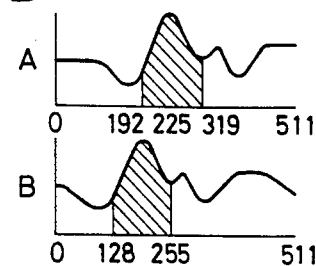
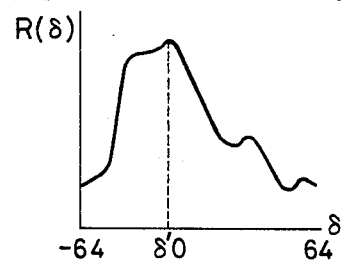
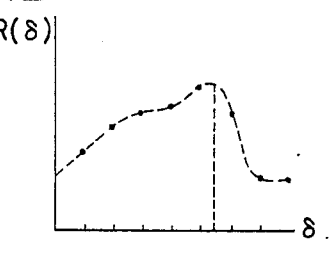
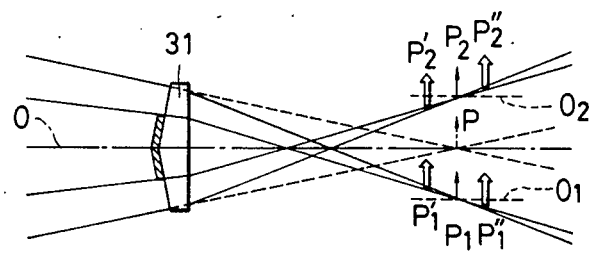

IMAGE

OUTPUT OF LIGHT RECEIVING ELEMENT

PULSE I

PULSE II

START PULSE

CLOCK PULSE

SAMPLE HOLDING PULSE

FOCUSING DEVICE FOR OPTICAL SYSTEMS

This is a continuation-in-part of application Ser. No. 436,488, filed Oct. 25, 1982, which was abandoned upon the filing hereof.

BACKGROUND OF THE INVENTION

1. Field of the Invention

This invention relates to focusing devices adapted to endoscopes and the like and more particularly to a focusing device of a system of detecting focusing displacement by utilizing the displacement in the direction vertical to the optical axis of an image by two light bundles divided except at the time of focusing by dividing by the time or space a part of a light bundle passing through or near a pupil of such optical system as of a microscope.

2. Description of the Prior Art

There is such conventional focusing device of this kind of type as is mentioned, for example, in Japanese Patent Publication No. 13929/1981. However, this is not of an idea of detecting the lateral displacement itself of an image but is of an idea of judging focusing when the light amount observed at one point varies as a result of an image causing lateral displacement and becomes equal to the light amount observed at another conjugate point. Therefore, there have been problems that the information of the entire image can not be effectively used, the sensitivity of focusing is low and a mis-operation is likely to be caused. Also, it is to detect only the peak value the same as in the conventional system of photoelectrically detecting the contrast of an object to be photographed. Therefore, there have been problems that whether focusing is front or rear can not be judged and that the amount of deviation of focusing can not be detected. Further, there has been a problem that, if the light division fluctuates, the light amounts of two images will be different from each other and therefore mis-focusing will be made.

SUMMARY OF THE INVENTION

In view of the above mentioned circumstances, a primary object of the present invention is to provide a focusing device wherein a first image formed by a light bundle having passed through a zone through or near a pupil and a second image formed by a light bundle having passed through a different zone are received respectively on a light receiving surface of a photoelectric converting device, the respective light intensity distributions are converted to photoelectric signals, the photoelectric signals are operated according to a predetermined evaluating function and the relative positions of the above mentioned two images on the light receiving surface are detected so as to be able to detect at a high precision the direction and amount of focusing deviation.

According to the present invention, this object is attained by a formation wherein a light receiving surface of a photoelectric converting device is arranged on or near a normal image forming surface of an image forming optical system, a first image formed by a light bundle having passed through a first zone in or near the position of a pupil of the image forming optical system and a second image formed by a light bundle having passed through a second zone different from the first zone are received respectively on the above mentioned light receiving surface, the respective light intensity distributions are converted to photoelectric signals, these photoelectric signals are operated according to a predetermined evaluating function and the relative positions of the first image and second image on the above mentioned light receiving surface are detected to judge the image forming state by the image forming optical system.

According to a preferred formation of the present invention, there are provided a light interrupting member having a first zone and second zone to pass a light bundle, an image sensor receiving a first image and second image formed by the light bundle having passed through the first zone and second zone and converting the respective light intensity distributions to photoelectric signals and a central operation circuit digital-converting the photoelectric signals from the image sensor, then separately memorizing the digital signals based on the light bundle having passed through the first zone and the digital signals based on the light bundle having passed through the second zone, operating them according to a predetermined evaluating function and thereby able to display the amount and direction of displacement of focusing.

The light interrupting member may be a rotatable disk in which the parts inside and outside a dividing line consisting of a periphery of a predetermined radius are formed to be transparent alternately at intervals of 90 degrees of the rotating angle or may be a triangular prism light-shielded in the central part.

According to another preferred formation of the present invention, a driving device for moving an image forming optical system is connected to a central operation circuit so as to be able to automatically make focusing with the output from the central operation circuit.

According to the present invention, as compared with detecting focusing by detecting the output variation with the movement of respective images by using a plurality of light receiving elements, the lateral displacement itself of the image is detected by receiving the information of the entire image by using an image sensor and therefore focusing can be detected accurately at a high sensitivity. Also, by only once photographing the image, the amount and direction of displacement of focusing can be detected. Further, as a correlative value can be computed from the image, the amount of displacement can be computed at a precision finer than the pitch of the image sensor. Also, as focusing is detected by computing the correlation of two images, even if the light amounts of the two images are more or less different from each other, they will be able to be corrected and no mis-focusing will be made. Further, as the light intensity distributions of the entire image are obtained as photoelectric signals, the brightness of the image can be known by using the total sum or average value of them and the light required to control exposure can be simultaneously measured on the basis of the brightness.

BRIEF DESCRIPTION OF THE DRAWINGS

FIGS. 4A, 4B, 4C and 4D show graphs showing light intensity distributions and correlations on image sensors;

FIG. 6 is a view showing another basic optical system to which an image information processing device according to the present invention is to be applied.

DESCRIPTION OF THE PREFERRED EMBODIMENT

Figure 1A:
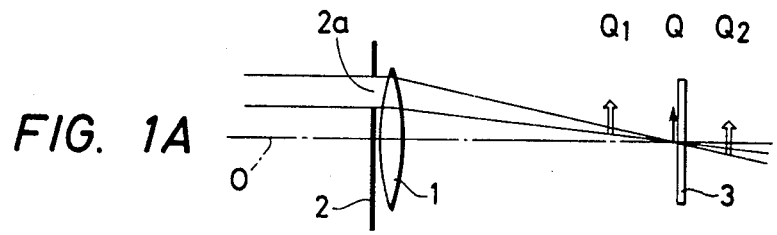
FIGS. 1A and 1B are views showing a basic optical system of an embodiment of the focusing device according to the present invention.
Figure 1B:
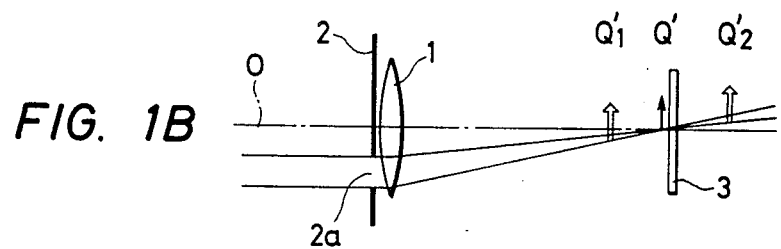

FIGS. 1A and 1B show a basic optical system of a focusing device according to the present invention. In the drawing, the reference numeral 1 denotes an image forming lens, 2 denotes a light interrupting plate arranged rotatably with an optical axis O as a center at or near a pupil in front of the lens 1 and provided with an aperture 2a positioned inside the pupil and 3 denotes such image sensor as a solid image pickup device provided in the focus position so that, an image Q will be formed on the focal surface, that is, on the image sensor 3 when focused and, as shown in (a), in case the aperture 2a is positioned above, and, as shown in (b), in case the aperture 2a is positioned below, images Q and Q' will be formed in exactly the same position in the direction vertical to the optical axis O but, at the time of nonfocusing, that is, at the time of front focusing or rear focusing, the image Q will be formed in the position other than on the focal surface, that is, other than on the image sensor 3. Therefore, on the image sensor 3, an unclear image $Q_1$ or $Q_2$ will be formed in a position deviated respectively to the other side in the direction vertical to the optical axis O from the image Q. Further, in the case of FIG. 1A and in the case of FIG. 1B, the image position will move as Q→Q' or $Q_2$→$Q_2'$. Therefore, if the image position is so adjusted as not to move even if the light interrupting plate 2 is rotated, the lens 1 will be rightly focused. The respective moving directions of the images $Q_1$ and $Q_2$ in the case of the front focusing and rear focusing are different from each other. Therefore, if the moving direction is detected, it will be possible to judge whether the front focusing or rear focusing is made. Further, the amount of deviation of focusing can be computed from the amount of deviation of the image Q or $Q_2$ and therefore focusing can be made by one operation.

Figure 3:
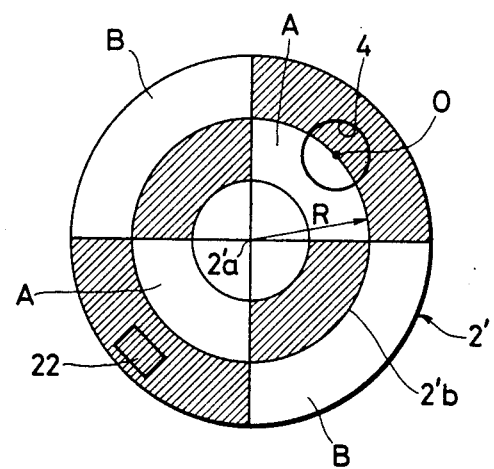
FIG. 3 is an elevational view of a light interrupting plate.
Figure 2:
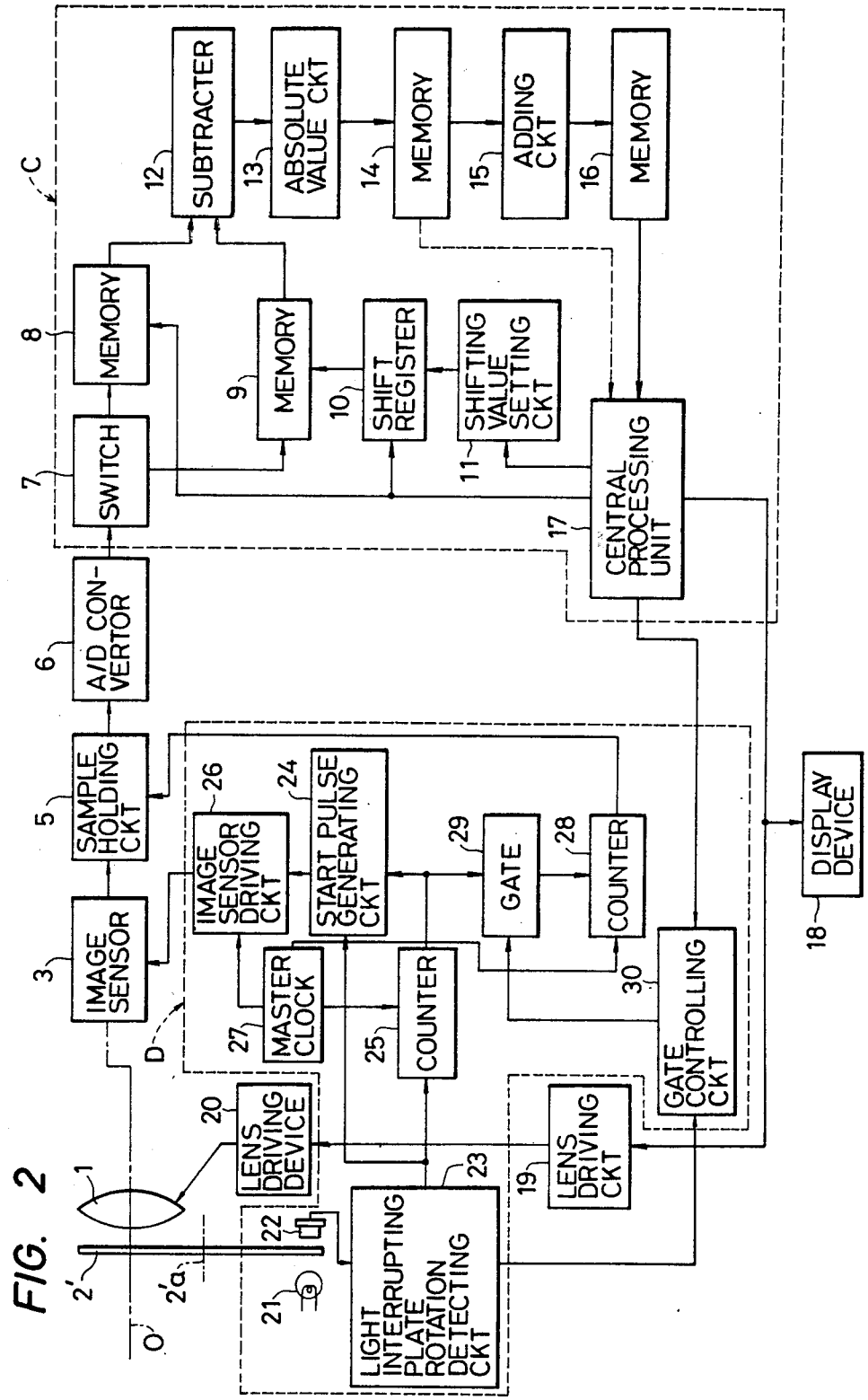
FIG. 2 is a block diagram of the electric circuit part of the focusing device shown in FIG. 1.

FIG. 2 shows a block diagram of the electric circuit part of the present focusing device. The reference numeral 2' denotes a light interrupting plate which has the center axis 2'a parallel with the optical axis, is rotatable around this axis 2'a, has as a boundary a dividing line 2'b consisting of the periphery of a radius R coinciding with the center of a pupil 4, that is, the optical axis O, has the parts inside and outside the boundary formed to be transparent alternately at intervals of a rotation angle of 90 degrees as shown in FIG. 3 and has the same function as of the light interrupting plate 2 shown in FIG. 1. The reference numeral 3 denotes an image sensor, for example, of 512 bits, 5 denotes a sample holding circuit and 6 denotes an analog-digital (A/D) converting circuit. The reference numeral 7 denotes a switch, 8 and 9 denote memories, 10 denotes a shift register, 11 denotes a shifting value setting circuit, 12 denotes a subtracter, 13 denotes an absolute value circuit, 14 denotes a memory, 15 denotes an adding circuit, 16 denotes a memory and 17 denotes a central processing unit and they form a central operation circuit C. The reference numeral 18 denotes a display device, 19 denotes a lens driving circuit and 20 denotes a lens driving device. The reference numeral 21 denotes a light source, 22 denotes a light receiving element arranged on the side opposed to the light source 21 with respect to the light interrupting plate 2', 23 denotes a light interrupting plate rotation detecting circuit, 24 denotes a start pulse generating circuit, 25 denotes a counter, 26 denotes an image sensor driving circuit, 27 denotes a master clock, 28 denotes a counter, 29 denotes a gate and 30 denotes a gate controlling circuit and they form an image information processing circuit D.

The present focusing device is formed as described above. First, the operation of the central operation circuit C shall be described. In the first state, that is, the state in which a light bundle passes through the transparent parts A (See FIG. 3) of the light interrupting plate 2', if the image formed by the light bundle is received by the image sensor 3, the light intensity distribution of the image will be converted to a photoelectric signal corresponding to it. This photoelectric signal will be held in the sample holding circuit 5, then will be converted to a digital signal in the analog-digital converting circuit 6 and will be housed in the memory 8 through the switch 7. Here the memory 8 is generally called 512 memories of $8_{-1}$, - - -, $8_{-512}$. That is to say, in this embodiment, 512 photoelectric outputs by the image sensor 3 will be obtained, will be therefore analog-digital converted in turn and will be housed in turn as fA(1), - - -, fA(512) in the memories $8_{-1}$, - - -, $8_{-512}$. By the way, they need not be analog-digital converted in turn but the photoelectric signals may be analog-digital converted parallelly at once. Then, the light interrupting plate 2' is rotated to be moved to the second state, that is, the state in which the light bundle passes through the transparent parts B (See FIG. 3), the light intensity distribution of the image formed by the light bundle is memorized through the image sensor 3, sample holding circuit 5, analog-digital converting circuit 6 and switch 7 the same as is mentioned above. At this time, if the switch 7 is switched to the memory 9 side, the analog-digital converted photoelectric signal will be housed as fB(1), - - -, fB(512) in the memories $9_{-1}$, - - -, $9_{-512}$. At this time, the light intensity distribution of the memorized image will be, for example, as shown in FIG. 4A. As the light intensity distributions in case the light passes through the transparent parts A and B are displaced from each other, it will be found that focusing is not made.

Then, the displacement of the image in case the light passes through the transparent parts A and B is computed by using the correlation. For example, by noting 128 bits (in FIG. 4B) of 512 bits, the correlation of fA(n) and fB(n) of the image in case the light passes through the transparent parts A and B is computed. For example, if the image in case the light passes through the transparent parts A is fixed at 192 to 319 bits and the image in case the light passes through the transparent parts B is displaced as in 128 to 255 bits, 129 to 256 bits, 130 to 257 bits, - - -, 255 to 382 bits and 256 to 383 bits and the correlation is computed, the amount of deviation from the focus position and the direction of the deviation will be found from the displacement of the image in case the light passes through the transparent parts B when the value of the correlation becomes a peak. In the light of FIG. 4B, the concrete example of the computing formula is considered to be $$R(\delta) = \sum_{x=192}^{319} fA(x)fB(x + \delta) \quad (1)$$

or $$R(\delta) = \sum_{x=192}^{319} ABS\{fA(x) - fB(x + \delta)\} \quad (2)$$

wherein $\delta = -64$ to $\delta = 64$ are computed and ABS is an absolute value. $\delta'$ at which $R(\delta)$ takes the peak (the maximum value in the case of the formula (1) or the minimum value in the case of the formula (2)) will be the displacement of the image (FIG. 4C).

This shall be explained in detail by exemplifying the case of using the above mentioned formula (2) on the basis of the central operation circuit C. First, a house number designating signal is issued from the central processing unit 17 and the data housed in the address number $x=192$, that is, in the memory $8_{-192}$ are taken into the subtracter 12. On the other hand, this address number designating signal will be put also into the shift register 10 and will be shifted here by a predetermined value of $\delta$ ($-64$ here) by the shifting value setting circuit 11 to designate the address number of the memory 9. Therefore, the contents of the memory $9_{-128}$ will be taken into the subtracter 12 in which the difference between both data, that is, fA(129)-fB(128) will be computed. This value will be sent to the absolute value circuit 13, will be converted to an absolute value and will be housed in the memory 14. When the signal that it has been housed is put into the central processing unit 17, the address number designating signals of the memories 8 and 9 will be displaced by the central processing unit 17 on the basis of the signal and $|fA(x) - fB(x+\delta)|$ corresponding to $x=193$ will be computed the same as is mentioned above and will be housed in the memory 14. Thereafter, in the same manner, that until $x=319$ will be repeated and housed in the memory 14. At this time point, all the contents of the memory 14 will be taken into the adding circuit 15 and $$R(-64) = \sum_{x=192}^{319} ABS\{fA(x) - fB(x - 64)\}$$

will be computed and will be kept housed in the memory $16_{-1}$. Then, by the instruction from the central processing unit 17, $\delta$ will be set at $-63$, x will be varied again to $x=192$ to 319 and $R(-63)$ will be computed the same as is mentioned above and will be housed in the memory $16_{-2}$. Thereafter, in the same manner, those until $R(64)$ will be computed in turn and will be housed in the memory 16.

When the above is completed, the contents of the memories $16_{-1}$ to $16_{-129}$, that is, $R(-64)-R(64)$ will be taken into the central processing unit 17 and will be compared. If the minimum value $R(\delta_o)$ is detected and thereby signals representing this value are generated, it will be found that the displacement of the image in the first state and in the second state is $\delta_0$. Therefore, as shown in FIG. 4C, by the size of this $\delta_0$, the displacement can be judged and, by the symbol, the displacing direction of the image (whether the image is displaced in front or rear of the normal focus position) can be judged. Therefore, if these signals are put into the lens driving circuit 19 and the lens 1 is moved by the lens driving device 20, automatic focusing will be able to be made. Further, it is needless to say that the above mentioned signals may be displayed by the display device 18 and focusing may be manually made on the basis of the display. By the way, the above mentioned $\delta$ corresponds to the individual bits in the image sensor 3. As $R(\delta)$ is computed, if a proper curved fitting or the like is made, a finer value of $\delta$ will be able to be obtained (See FIG. 4D), that is to say, the displacement of the image will be able to be detected to be finer than the pitch distance of the image sensor.

As an example, a curve fitting method will be explained in detail. In the signal process, the amount of displacement of the second image to the first image is obtained as such value of $\delta$ represented by $\delta_1$) that $R(\delta)$ may be maximum (in the example applying the formula (1)). This implies that it has been detected that the second image is displaced by $\delta_1$ for the pixel element of the image sensor with respect to the first image.

However, since $\delta$ is set so as to be able to take only the integer value, for example, even if the value of $\delta_1 = S$ is obtained, a case occurs in which the two images are really displaced by 5.2 for the pixel element.

Figure 8:
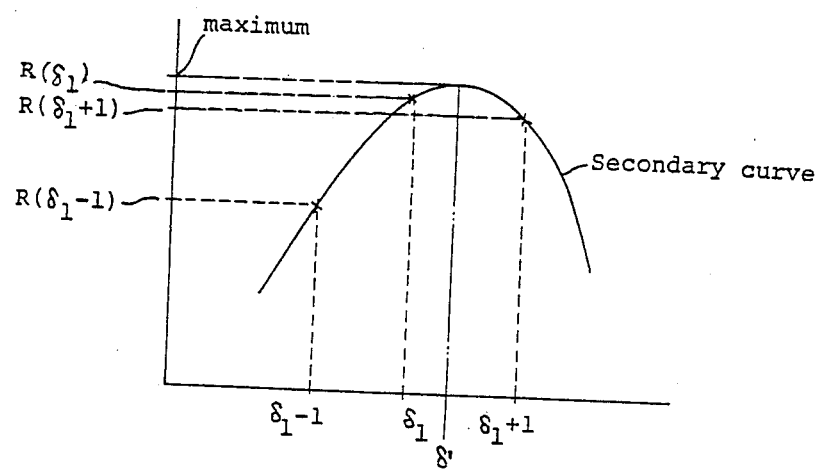
FIG. 8 shows a curve fitting method in accordance with the present invention.

As a method of detecting accurately the above description, a curve fitting method using the secondary curve illustrated in FIG. 8 is considered.

Here, three points are selected near the point at which $R(\delta)$ becomes maximum and a function of a secondary curve passing through the three points is obtained so that an approximate curve may be drawn as if $R(\delta)$ is continuously changed and the maximum value of $\delta$ of the secondary curve may be regarded as $\delta'$ which is the amount of displacement to obtain $\delta$ with a finer accuracy than the pitch of the pixel element.

The secondary curve is used because the changes of the values near the maximum value relative to each other may be often approximated by the secondary curve is $$R(\delta) = a(\delta - \delta_1)^2 + b(\delta - \delta_1),$$

if $$R(\delta_1 - 1) = \alpha, R(\delta_1) = \beta, \text{ and } R(\delta_1 + 1) = \gamma,$$

$$\alpha = a - b + c$$

$$\beta = c$$

$$\gamma = a - b + c$$

From the above three formulas, a and b are expressed by $$a = \frac{\alpha + \gamma - 2\beta}{2}$$

$$b = \frac{\gamma - \alpha}{2}$$

Therefore, the following approximate formula is obtained.

$$R(\delta) = \frac{\alpha + \gamma - 2\beta}{2} (\delta - \delta_1)^2 + \frac{\gamma - \alpha}{2} (\delta - \delta_1) + \beta$$

From

-continued
$$\frac{dR(\delta)}{d\delta} = 0, (\alpha + \gamma - 2\beta)(\delta - \delta_1) + \frac{\gamma - \alpha}{2} = 0$$

is obtained. Thus, the maximum value is expressed by $$\delta = \delta_1 + \underline{\frac{1}{\alpha + \gamma - 2\beta}} \cdot \frac{\alpha - \gamma}{2},$$

where the underlined part is a correcting member.

Figure 5A:
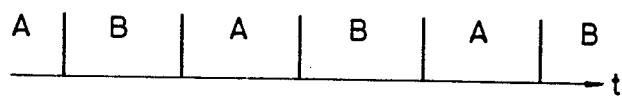
FIGS. 5A, 5B, 5C, 5D, 5E, 5F and 5G show time charts.
Figure 5B:
Figure 5C:
Figure 5D:
Figure 5E:
Figure 5F:
Figure 5G:

Now, the principle of automatically removing the unnecessary images among the images picked up by the image sensor 3, that is, the overlapping images produced in case either one of the above mentioned first and second states shifts to the other shall be explained on the basis of the image information processing circuit D. FIGS. 5A to 5G are of time charts. FIG. 5A shows variations of an image. First of all, as the light receiving element 22 is set in such position as is shown in FIG. 3 with respect to the light interrupting plate 2', the light amount received by the light receiving element 22 by the rotation of the light interrupting plate 2' will vary as in FIG. 5B with the time. On the basis of the output of this light receiving element 22, the light interrupting plate rotation detecting circuit 23 will produce two kinds of pulses I generated whenever the brightness and darkness vary and pulses II whenever the darkness varies to the brightness as shown in FIGS. 5C and 5D. Then, the pulses I will be simultaneously put into the start pulse generating circuit 24 and the counter 25. In this case, the start pulse generating circuit 24 will generate such start pulses as are shown in FIG. 5E by the input of these pulses I and will put them into the image sensor driving circuit 26. On the basis of this input signal, the driving circuit 26 will drive the image sensor 3 with clock pulses (See FIG. 5F) generated by the master clock 27, will read out in turn the photoelectric outputs stored in the image sensor 3 and will transfer them to the sample holding circuit 5. However, this sample holding circuit 5 will hold the data transferred only when the later described sample holding pulses (See FIG. 5G) are put in but will not hold the data and abandon them in the other cases. However, these are photoelectric signals stored when the first state varies to the second state and are not necessary. On the other hand, the counter 25 will count the clock pulses of the master clock 27 by the input of the pulses I only for a predetermined image storing time and will put out a signal when the master clock pulses reach a predetermined number (at least 512 in this example). This signal will be simultaneously put into the start pulse generating circuit 24 and counter 28. As the start pulse generating circuit 24 operates the same as when signals are received from the detecting circuit 23, thereafter, as described above, the data from the image sensor 3 will be transferred in turn to the sample holding circuit 5. On the other hand, the counter 28 will begin to count the master clock pulses by the signal of the counter 25 and will send the sample holding pulses to the sample holding circuit 5 for each count. As the timings of the feed of these sample holding pulses and the feed of the data from the image sensor 3 just coincide with each other, all the data from the image sensor 3 will be held in the sample holding circuit 5. The count number of this counter 28 is the same as the image number of the image sensor 3 and is 512 in this embodiment. The data held in the sample holding circuit 5 will be converted to digital signals in the analog-digital converting circuit 6 and will be taken into the central processing unit 17 to be used for the later processing by the above described principle. Then, when the pulse I emits from the detecting circuit 23, the start pulse generating circuit 24 will again operate and then the data will be taken into the central processing unit 17 the same as is mentioned above. As evident from the above, in this formation, the data obtained just after the detecting circuit 23 operates will be abandoned and the next obtained data will be held. Therefore, the photoelectric output obtained from the image sensor 3 just after the detecting circuit 23 operates, that is, the image signal stored when the transparent parts of the light interrupting plate 2' vary from A to B or from B to A will have two images mixed in, will not be adapted to focusing detection and will be therefore abandoned. On the other hand, the image signal beginning the image storage when the pulse I emits and ending the storage after a predetermined time counted by the counter 25 is an image signal of only either one of the state that the light is passing through the transparent parts A and the state that the light is passing through the transparent parts B, will be adapted to focusing detection and will be kept without being abandoned. Thus, only the necessary image information can be kept.

By the way, in this embodiment, in focusing detection, unless the informations of the two states that the light passes through the transparent parts A and B come in as paired, no focusing detection will be able to be made. (In order to detect the displacement of the image, two informations of images will be required.) It is not good and must be avoided that the image information will be automatically sent in even when no image information is required in the central processing unit 17. Therefore, the above mentioned pulses II are used. That is to say, when a read-in signal from the central processing unit 17 is put into the gate controlling circuit 30 and then the pulses II are put in from the detecting device 23, an output will be put out to switch and keep the gate 29 on. Therefore, in this state, the operation from the generation of the start pulses to the generation of the sample holding pulses will be made as mentioned above and the image informations will come to be sent in turn into the central processing unit 17 in the order of the transparent parts B, A, B, A, - - - -. On the other hand, in case the image information becomes unnecessary in the central processing unit 17, when a signal is sent to the gate controlling circuit 30 from the central processing unit 17, the gate controlling circuit 30 will switch and keep the gate 29 off when the pulses II are put in.

Therefore, in this state, no sample holding pulse will be sent out to the sample holding circuit 5 and any data will no longer come into the central processing unit 17. If made as in the above, the input of the image informations will always end in the order of the transparent parts B, A, - - -, B, A, the image informations in the case of the transparent parts B and A will always come in turn by the same number into the central processing unit 17. Therefore, when the image informations of the states of the transparent parts B and A are used as paired, focusing detection will be possible.

FIG. 6 shows an optical system somewhat different from the optical system shown in FIG. 1. The reference numeral 31 denotes a prism provided near the pupil and performing the role corresponding to that of the light interrupting plate 2 in FIG. 1. According to this, the image at the time being in focus to be naturally formed in the position of P will be formed in the positions $P_1$ and $P_2$ and, at the time being out of focus, the image will be formed in the positions $P'_1$ and $P'_2$ or the positions $P''_1$ and $P''_2$. If these are considered on the basis of the optical axis $O_1$ and $O_2$ of the images in the positions $P_1$ and $p_2$ at the time being in focus, it will be found that the positions $P'_1$ and $P'_2$ or the positions $P''_1$ and $P''_2$ are displaced in the directions vertical respectively to the optical axes $O_1$ and $O_2$. That is to say, the principle is the same as of the optical system in FIG. 1. In the system in FIG. 1, the displacement of the image is observed as a vibration by the time division but, in the system in FIG. 6, the focusing may be considered to be observed in two places by the space division. Even in the system in FIG. 6, if the positions $P_1$ and $P_2$ of the images are close to each other, two images will be able to be picked up with one image sensor but the peripheral side of the image formed in the position $P_1$ will be likely to overlap the image in the position $P_2$ and therefore a field stop may be provided to be stopped in advance so that the visual field will not be overlapped. By the way, the time dividing system and space dividing system shall be compared with each other. The time dividing system has a merit that, as the images are formed in the same place, in case the images overlap, if they are focused, the criterion of judging focusing or nonfocusing will be easy to determine but has a demerit that such mechanically moving mechanism as a rotating light interrupting plate is required. The space dividing system has a merit that no mechanically moving mechanism is required but has a demerit that, as the images can not be formed in the same place, the criterion of judging focusing or nonfocusing will be difficult to determine.

Figure 7:
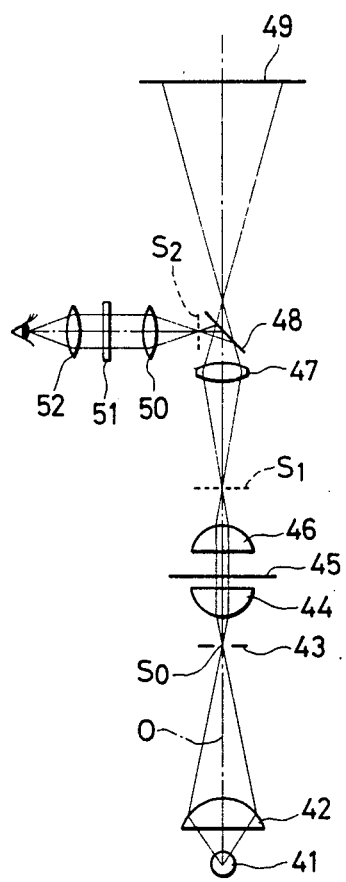
FIG. 7 is a view showing an optical system of a microscopic photographing device using the embodiment shown in FIG. 2.

FIG. 7 shows an optical system of a microscopic photographing device using a focusing device including the present device. The reference numeral 41 denotes a light source, 42 denotes a collector lens, 43 denotes an aperture stop of an illuminating system placed in the pupil position $S_0$ of the optical system, 44 denotes a condenser lens, 45 denotes a sample, 46 denotes an objective, 47 denotes an eyepiece, 48 denotes a beam splitter, 49 denotes a film surface, 50 denotes a relay lens, 51 denotes a focussing glass and 52 denotes a viewer. The light interrupting plate 2' shown in FIG. 3 is arranged near the place of any of the respective pupil positions $S_0$, $S_1$ and $S_2$. The optical system in FIG. 7 is so formed that observation can be made with the naked eye. Here, if the image sensor 3 is placed in the position of the focussing glass 51, a focusing device including the present device will be able to be used.

By the way, the image information processing device as described above can be applied not only to focusing but also to various uses. For example, in the case of spectroscopic measurement with two light bundles by using an image pickup device, the present invention can be used to remove unnecessary informations in the case of alternately putting in a standard light bundle and a sample light bundle by using a chopper or the like. Further, it can be used also in the case of making a VTR from a movie film. That is to say, the movie film has a black partition between picture frames. The data by it can be abandoned as unnecessary data in the case of moving from one picture frame to the other picture frame.

I claim:

1. A focusing device for optical systems comprising an image forming optical system, a light interrupting member located at the position of a pupil of said image forming optical system and having a first zone and second zone capable of passing a light bundle from an object, a photoelectric converting device arranged on the predetermined image forming surface of said image forming optical system, having a light receiving surface capable of receiving a first image formed by the light bundle having passed through said first zone and a second image formed by the light bundle having passed through said second zone and converting the light intensity distributions of said first image and second image respectively to electric signals, a central operation circuit being supplied with said electric signals and operating said electric signals according to a predetermined evaluating function and thereby generating resultant signals representing the direction and amount of displacement of said second image to said first image, and a driving means being supplied with said resultant signals and performing an auto-focusing according to said resultant signals.

2. A focusing device for optical systems according to claim 1, wherein said optical systems are microscopes and said amount of displacement of said second image to said first image is obtained from a proper curve fitting.

3. A focusing device for optical systems according to claim 2, wherein said focusing device further comprises a display means capable of displaying said resultant signals generated by said central operation circuit.

4. A focusing device for optical systems according to claim 3, wherein said light interrupting member is a rotatable disk in which the parts inside and outside a circular dividing line having a predetermined radius are formed to be transparent alternately at intervals of 90 degrees of the rotating angle.

5. A focusing device for optical systems according to claim 4, wherein said light interrupting member is a prism light-shielded in the central part.

* * * * *